(12) United States Patent
Byrne et al.

(10) Patent No.: US 8,393,077 B2
(45) Date of Patent: Mar. 12, 2013

(54) FABRICATION OF PASSIVE ELECTRONIC COMPONENTS

(75) Inventors: Lorraine Byrne, Dublin (IE); Kevin Dooley, Blessington Co. Wicklow (IE); David Fitzpatrick, Rathfeigh (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 558 days.

(21) Appl. No.: 12/560,284

(22) Filed: Sep. 15, 2009

(65) Prior Publication Data

US 2011/0063776 A1    Mar. 17, 2011

(51) Int. Cl.
*H01F 17/00*    (2006.01)
*H01G 4/228*    (2006.01)
*H01G 13/00*    (2006.01)

(52) U.S. Cl. .......... 29/847; 29/25.41; 29/602.1; 29/830; 336/200

(58) Field of Classification Search .......... 29/602.1, 29/846, 847, 850, 830, 25.41; 336/200
See application file for complete search history.

(56) References Cited

U.S. PATENT DOCUMENTS

| | | | |
|---|---|---|---|
| 5,307,045 A * | 4/1994 | Senda et al. | 336/200 |
| 6,376,292 B1 | 4/2002 | Youn et al. | |
| 6,815,220 B2 * | 11/2004 | Crawford et al. | 438/3 |
| 7,056,834 B2 | 6/2006 | Mei et al. | |
| 2003/0232482 A1 | 12/2003 | Yu | |
| 2005/0003562 A1 | 1/2005 | Bhatt et al. | |
| 2005/0212641 A1 | 9/2005 | Hung et al. | |
| 2007/0033796 A1 | 2/2007 | Rudin | |
| 2008/0018419 A1 | 1/2008 | Dong et al. | |

OTHER PUBLICATIONS

Li, H.Y., et al.; "Flexible High Performance Capacitor on Soft Elastic Material"; 2008; 2008 10th Electronics Packaging Technology Conference; IEEE; pp. 1431-1435.
Burkard, Dr. Hans, et al; "An ultra-thin, highly flexible Multilayer"; http://www.hightec.ch/uploads/media/An_ultra-thin_highly_flexible_Multilayer_2007.pdf; Hightec MC AG; Switzerland.
"Shift 'Smart High Integration Flex Technologies'"; http://www.vdivde-it.de/portale/shift/Publications/Publishable_pdf_2006-1.

* cited by examiner

*Primary Examiner* — Livius R Cazan

(57) ABSTRACT

A method for fabrication of passive electronic components includes disposing a sacrificial layer on a carrier and forming a curable resin layer on top of the sacrificial layer and patterning the curable resin to form a cured resin template having multiple pattern levels. A metal material is deposited into the first pattern level to form a first structure. A dielectric material is then formed on exposed portions of the first structure. A nonselective subtractive process is used to expose the sacrificial layer in a bottom of the second pattern level and metal material is deposited into the second pattern level and built up to include a portion which crosses over the dielectric material.

13 Claims, 10 Drawing Sheets

FABRICATION OF PASSIVE ELECTRONIC COMPONENTS

BACKGROUND

In traditional integrated circuit manufacturing on rigid substrates, passive devices such as capacitors and inductors are typically surface mounted as discrete components via soldering or as embedded integrated devices. These integrated devices can be created from thin films of materials deposited via standard vacuum processes with photolithographic patterning or from thick films which are deposited by screen printing of pastes which are then fired at high temperatures.

These approaches can be unsuitable for manufacturing passive devices on flexible polymer substrates for a number of reasons. For example, the high processing temperatures associated with soldering of discrete components or firing of ceramic pastes could cause significant thermal degradation of the polymer substrate. Additionally, the polymer substrate can undergo a significant amount of dimensional distortion (such as bending and stretching) during handling. This can create challenges in aligning the sequential deposition/subtraction steps during photolithography or other processes.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Flexible electronics are a technology for assembling electronic circuits by creating or mounting electronic devices on flexible plastic substrates, including but not limited to polyimide, polyester, polyarylite, polyolefin or polyaryletheretherketone. The resulting flexible electronic assemblies allow the circuit to conform to a desired shape or flex during use. This can be particularly desirable in tightly assembled electronic devices, folding cell phones, to replace bulky wiring harnesses connecting sub-assemblies or to enable new applications including conformable electronic displays, touch screens & touch pads, solar cells and sensor arrays.

However, there can be a number of challenges in creating flexible electronic assemblies. In particular, the susceptibility to bending and stretching and low melting point of the substrate can prevent precise alignment during a series of sequential forming steps and limit the process temperatures.

For example, there are a number of components which are typically soldered to a substrate, such as passive devices such as resistors, capacitors, and inductors. In some cases flexible substrate materials may not be able to withstand the high temperatures involved with soldering or reflowing operations.

Additionally, the polymer substrate can undergo a significant amount of dimensional distortion (such as bending, stretching) during handling. This can create challenges in aligning the sequential deposition/subtraction steps during photolithography or other processes.

As described below, one illustrative method for creating passive components and interconnections on flexible circuits involves the formation of a passive electronic component on a sacrificial carrier substrate and, then attaching the completed passive electronic component to the flexible substrate by lamination and peel off transfer. The sacrificial substrate can be a rigid silicon or glass substrate which is coated in a metal film, alternatively the sacrificial substrate can be a metal sheet or foil. According to one illustrative embodiment, capacitors and inductors are formed using a three dimensional template. The three dimensional template is created by depositing a polymer resin on a sacrificial substrate. The polymer resin is then patterned and cured to form the three dimensional template in which the passive electronic component is later formed. Portions of the three dimensional template are etched away to expose an underlying sacrificial substrate. The traces which make up the electronic component are then deposited by selective electro-deposition of metal and dielectric layers. The three dimensional template automatically aligns the metal and dielectric layers. Consequently, there is no need for costly and precise alignment steps in forming the passive electronic components. After the formation of the passive electronic component is complete, the sacrificial substrate is removed and the passive electronic component is adhered to the flexible substrate. This process can be used in both roll-to-roll processing and batch processing.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

A basic structural element within the passive electronic devices described below is a metal-dielectric-metal stack called a "crossover." A "crossover" refers to the routing two intersecting conductive traces over each other without electrically shorting the two traces. To do this, a first metal trace is formed. At the point where a second metal trace is to crossover the first metal trace, a dielectric material is deposited. The second metal trace is then formed over dielectric material on the first metal trace. The dielectric material is sandwiched between the two conductors at the crossover point and prevents the two conductors from electrically shorting.

Figure 1A:
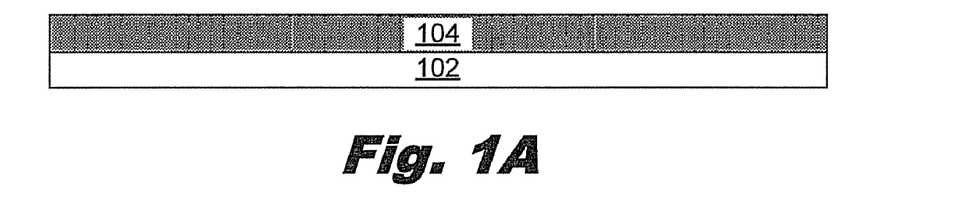
FIGS. 1A-1H show steps in an illustrative process for fabricating passive electronic devices, according to one embodiment of principles described herein.

FIGS. 1A-1H show illustrative steps in a multi-level self aligned fabrication process for forming crossover regions within a three dimensional polymer template. FIG. 1A illustrates a first step in the process where a sacrificial layer (104) is formed on top of a carrier substrate (102). According to one illustrative embodiment, the carrier substrate (104) may be made of stainless steel. The sacrificial layer (104) should be capable of adhering to the carrier substrate for the duration of the processing and being removed at the peel off transfer step. According to one illustrative embodiment, the sacrificial layer (104) is a metal film which is deposited onto a conductive carrier substrate by electroplating (102). Additionally, the sacrificial metal layer (104) may have the capability to be preferentially etched by one or more etchant solutions. This allows the sacrificial metal layer (104) to be chemically removed after the creation of the desired passive electronic structure. For example, the sacrificial metal layer (104) may be a layer of copper which is about 5 μm thick. As used in the specification and appended claims, the term "electro-deposition" "electroplating" or "electro-deposition process" refers to the deposition of material on a conductive surface submerged in an electrolyte solution under the influence of an electric current. The electrolyte solution contains the material to be deposited as solubilized charged species. In this illustrative embodiment, the sacrificial metal carrier (104) serves as the electrode during subsequent electroforming steps. In another embodiment the sacrificial layer is a conductive polymer or resin which can be coated onto the carrier substrate as a liquid and dried to form a continuous conductive film. Alternatively the sacrificial layer can be a non conductive resist which is coated onto the carrier substrate as a liquid and dried to form a continuous film. This film is then patterned along with the templating resin to expose the underlying conductive surface of the stainless steel carrier to enable to subsequent electroplating steps. In all of the above cases, the sacrificial layer is removed chemically at the peel off transfer stage of the process.

Figure 1B:
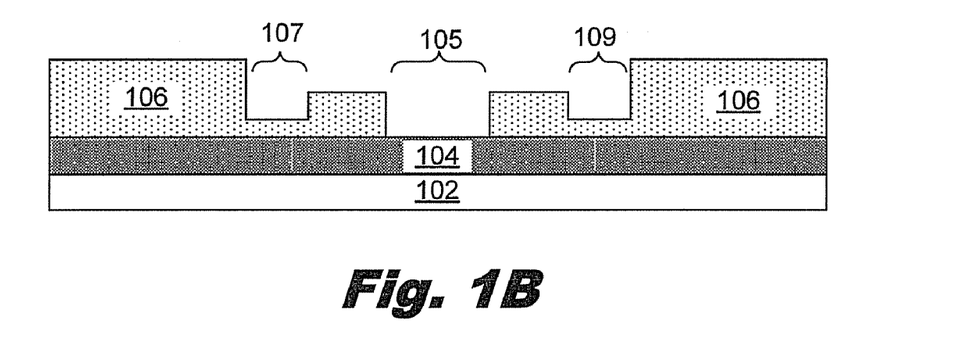

FIG. 1B shows a next step in the illustrative fabrication process. In this illustrative step, the sacrificial metal layer (104) is coated with a curable polymer resin (106). The resin (106) may be treated to permanently hold a shape by means of exposure to heat, pressure, chemical reactions, UV-light, or other form of electromagnetic radiation. For example a UV curable polymer resins form cross linkages between polymer chains when exposed to UV light. This cross-linking solidifies the resin. Thermally curable polymer resins are designed to solidify when exposed to elevated temperatures which trigger polymerization or other chemical changes.

A three-dimensional multi-level template (106) is then created in the resin. By way of example and not limitation, the three dimensional multi-level template (106) may be created through an embossing process. Embossing refers to pressing a master mold into uncured resin to transfer the shape of the master into the resin. The resin is then cured and retains the desired three-dimensional multi-level shape. When using a roll-to-roll fabrication method, a cylinder could be created with desired master pattern around its perimeter. The desired three dimensional multi-level template could be formed by pressing the master pattern into the resin (106) as substrate passes under or around the cylinder. The template may also be created through a variety of photolithographic processes. After or during the embossing process, the resin is cured to retain the desired shape.

In order selectively form metal traces within the three dimensional multi-level template (106), a portion of the upper surface of the sacrificial layer (104) is exposed. When the assembly is placed in the electroplating solution, the sacrificial layer (104) acts as the surface on which the metal is deposited by electrodeposition. (104). By sequentially exposing various portions of the conductive sacrificial material (104) within the template, the desired metal and dielectric layers can be deposited.

According to one illustrative embodiment, the embossing process displaces the resin at the bottom of a center channel and exposes upper surface of the sacrificial strip (104). However, there may be some remnants of the resin which remain on the bottom of the center channel (105). In other embodiments, a thin floor of polymer material may be formed over the bottom of the center channel during the embossing process. In either case, nonselective subtractive process, such as plasma ashing, may be used to remove any polymer material from the bottom of the center channel (105) and expose the sacrificial strip (104). In the specification an appended claims, the term "nonselective subtractive process" refers to a material removal process which is applied over the entire surface of the assembly. Consequently, the nonselective subtractive process does not require precise mechanical alignment with the passive electronic device.

One example of a nonselective subtractive process is plasma ashing. Plasma ashing is a subtractive process in which a highly reactive species such as oxygen or fluorine is used to corrode the top surface of the resin. This creates an ash which may then be removed in a variety of methods, including vacuum pumping. The plasma ashing process is not a selective process and does not require precise alignment. Instead the plasma ashing is applied uniformly and removes material from the entire surface of the curable resin. The thickness of the three dimensional multilevel template (106) determines which portions of the sacrificial layer (104) are exposed. Specifically, the bottoms of the channels may have different thicknesses. By incrementally applying plasma ashing over the template (106), the bottoms of the various channels can be sequentially removed to expose the underlying sacrificial layer (104). For example, the plasma ashing process can be timed so that a sufficient amount of resin is removed from the center channel (105) but does not expose the sacrificial layer in at the bottoms of adjacent channels (107, 109).

Figure 1C:
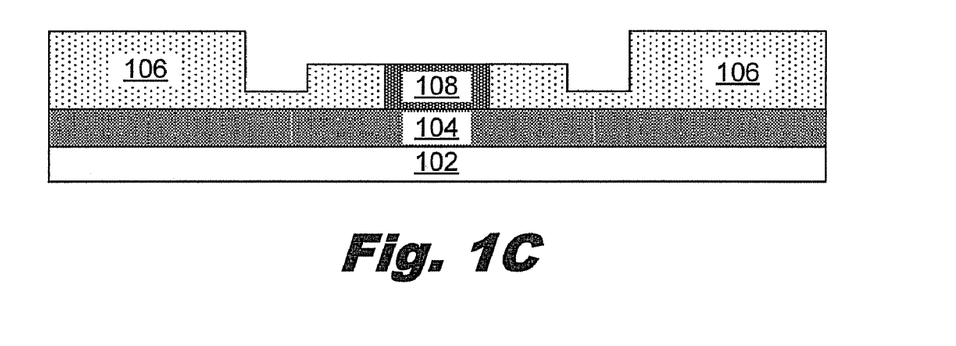

FIG. 1C illustrates the next step in the fabrication process (100) wherein a metal (108) is deposited into the exposed center channel of the resin template (106). Once the sacrificial layer (104) has been completely exposed at bottom of the center channel (105), a central metal trace (108) may be built up in the center channel (105). The electro-deposition process is timed so that the deposition occurs long enough to fill the center channel (105) of the template, but not spill over into other areas of the template. The deposited metal may be a variety of metals or metal alloys or be composed of layers of different metals or metal alloys. By way of example and not limitation, these metals or metal alloys may include, but are not limited to, copper, silver, nickel, gold, and their alloys.

According to one illustrative embodiment, the electrodeposition process involves placing the assembly in an electrolyte solution containing dissolved salts of the metal to be deposited and applying a voltage across two electrodes.

Under the influence of the electric field, the dissolved metal ions migrate towards negatively charged electrode (cathode) where they are chemically reduced at the solution to surface interface. This reaction results in the deposition of metal atoms on the cathode surface which over time build up to form a continuous film. As illustrated in FIG. 1C, the exposed portion of the sacrificial layer serves as the cathode and builds up electro-deposited metal to form a conductive central trace (108).

Alternatively, the metal film may be deposited via an electroless process which does not require the application of an electric current. In this approach the electrolyte solution contains a mild reducing agent such as sodium hypophosphite along with the metal salt. The exposed metal surface acts as a catalytic surface for the oxidation-reduction reaction between the metal ions and the reducing agent. This oxidation-reduction reaction results in the deposition of metal on the exposed metal surface.

Figure 1D:
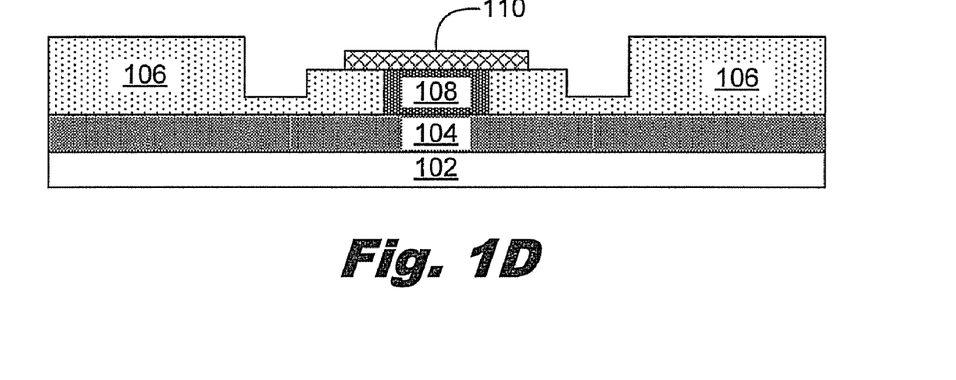

FIG. 1D illustrates the next step of the fabrication process in which a dielectric material (110) is deposited on top of the first layer metal (108). The dielectric material (110) may be formed using a variety of processes, including but not limited to, electro-deposition and/or anodization. A variety of dielectric materials may be used in the present fabrication process (100). These dielectric materials include but are not limited to electro-depositable polymers, inorganic-polymer composites, and metal oxides. Electro-depositable polymers may take the form of charged micelle stabilized polymers in an aqueous solution. Through the electro-deposition process, these polymers will migrate by electrophoresis towards an anode or a cathode depending on the charge of the micelles. According to one illustrative embodiment, the micelles become neutralized at the electrode surface by oppositely charged species which are generated at the electrode solution interface by the hydrolysis of water. The neutralized polymer particles are thereby deposited, forming a dielectric film (110) which covers the central trace (108).

Additionally or alternatively, inorganic ceramic nanoparticles may be used to form the dielectric film (110). According to one illustrative embodiment, ceramic nanoparticles such as barium titanate are suspended in an electrodepositable polymer solution using surfactants. The suspended inorganic and polymer particles must have equivalent charge otherwise agglomeration will occur. The nanoparticles will co-migrate with the electrodepositable polymer co-deposit on the electrode surface to form an inorganic nanocomposite-polymer film Incorporating nanoparticles in the dielectric layer (110) may have a number of benefits. For example, the nanoparticles may form a material with a higher dielectric constant than a pure polymer layer. The higher dielectric constant layer interposed between two electrodes produces a higher capacitance between the two traces. In addition, the presence of these nanoparticles will confer superior selectivity to plasma ashing on the dielectric film over the template resin. Metal oxides may also be used to form the dielectric layer (110). For example, metal oxides may be formed by exposing the assembly (100) to an oxidizing environment. According to one illustrative embodiment, the top surface of the center trace (108) may be anodized in the presence of a suitable electrolyte to create the dielectric layer (110). In this anodization process, the center trace is used as the anode and the cathode consists of an inert material such as platinum. For the anodization process the metal of the center trace should be a material which can form an oxide via anodization which possesses the required electrical properties and which is capable of withstanding exposure to the chemicals of the subsequent process steps. Examples of these metals include but are not limited to copper, silver, and zinc. In another embodiment combinations of anodization and elcetrophorectic deposition of a polymer may occur to achieve a continuous film with the desired mechanical properties.

Figure 1E:
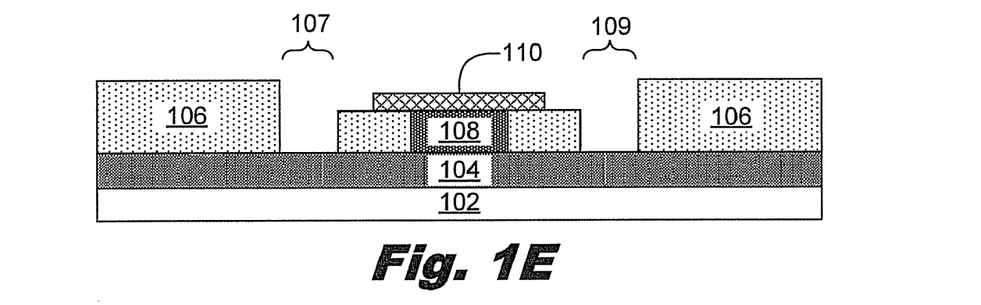

FIG. 1E shows a subsequent step in the illustrative fabrication process in which plasma ashing is used to remove the resin from the bottom of the two adjacent channels (107, 109). This will expose the sacrificial layer (104) in the bottom of these channels (107, 109) so that metal can be selectively electro-deposited in these channels (107, 109). The plasma ashing process can be timed so that a sufficient amount of resin is removed from the second level of the template to expose the conductive surface underneath without removing the polymer dielectric coating center metal trace.

Figure 1F:
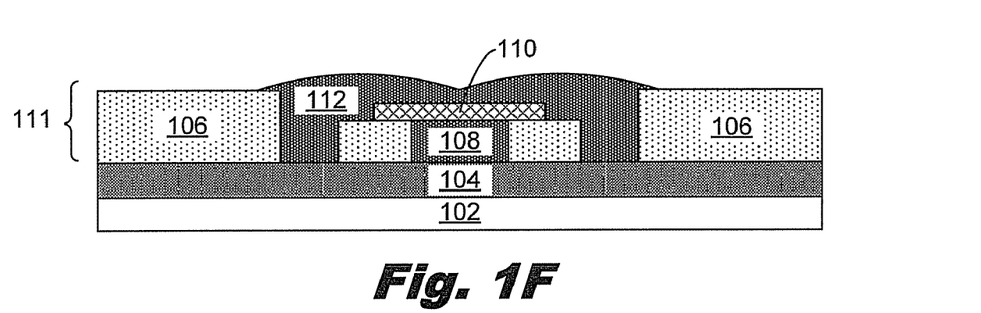

FIG. 1F shows electro-deposition of traces in the adjacent channels (107, 109). This electroplating is similar to the step illustrated in FIG. 1C. The metal is built up through electroplating processes until it forms a crossover trace (112) which covers the dielectric material (110). The highest walls of the templated resin (106) prevent the metal which makes up the crossover trace (112) from spilling out of the walls of the template (106). The crossover trace (112) is electrically isolated from the center trace (108) by the resin walls and the dielectric layer (110) which surrounds the center trace (108). The crossover structure (111) is now complete and ready to be transferred to the flexible substrate. In some embodiments, this crossover structure (111) could be used to route an intersecting trace over an underlying trace without making electrical contact between the two traces.

Figure 1G:
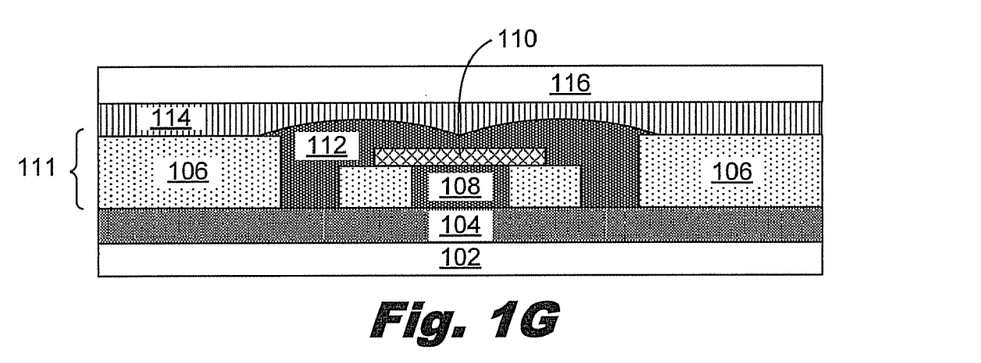

FIG. 1G shows the crossover structure (111) being transferred to the flexible substrate (116). According to one illustrative embodiment, the flexible polymer substrate (116) is coated with a layer of curable liquid resist to reduce the topography of the surface for subsequent lamination and peel steps. This resist should be of an appropriate viscosity and thickness to ensure that it can flow around the topographical features and create a planar surface. The planarization layer may comprise of a material which can be cured by exposure to heat, UV light or other electromagnetic radiation. The cured planarization layer is then coated with a transfer adhesive (114). This transfer adhesive may be a material which is cured by the application of heat, light or pressure. The flexible polymer substrate (116) is then laminated to the top of the crossover structure (111) and the transfer adhesive is cured with the polymer substrate in situ.

Figure 1H:
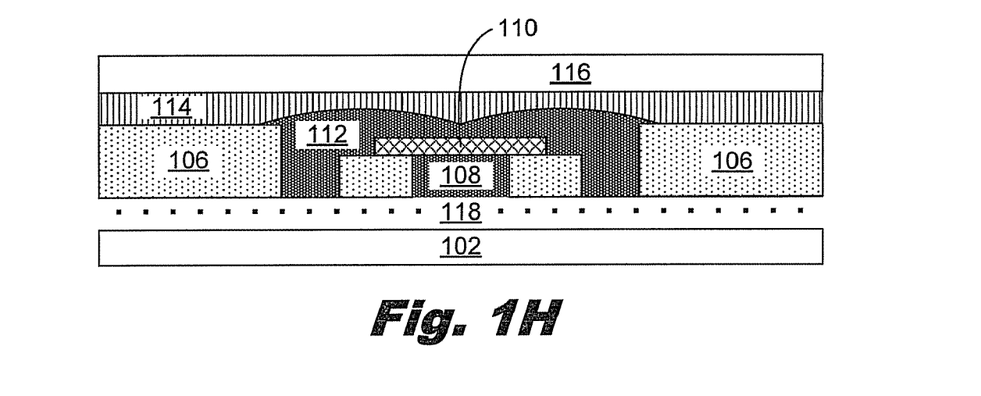

FIG. 1H shows a final step in the illustrative fabrication process (100) in which the metal carrier (102) and sacrificial metal layer (104) are removed. According to one illustrative embodiment, the sacrificial metal layer (104) is peeled away from the metal carrier (102). The sacrificial metal layer (104) is then etched away using a dilute etching solution.

Passive electronic components such as resistors, capacitors and inductors can be manufactured using resin templates which include crossover regions. The resin template can be designed such that produces a device with the desired electrical characteristics such as resistance capacitance and inductance.

Figure 2A:
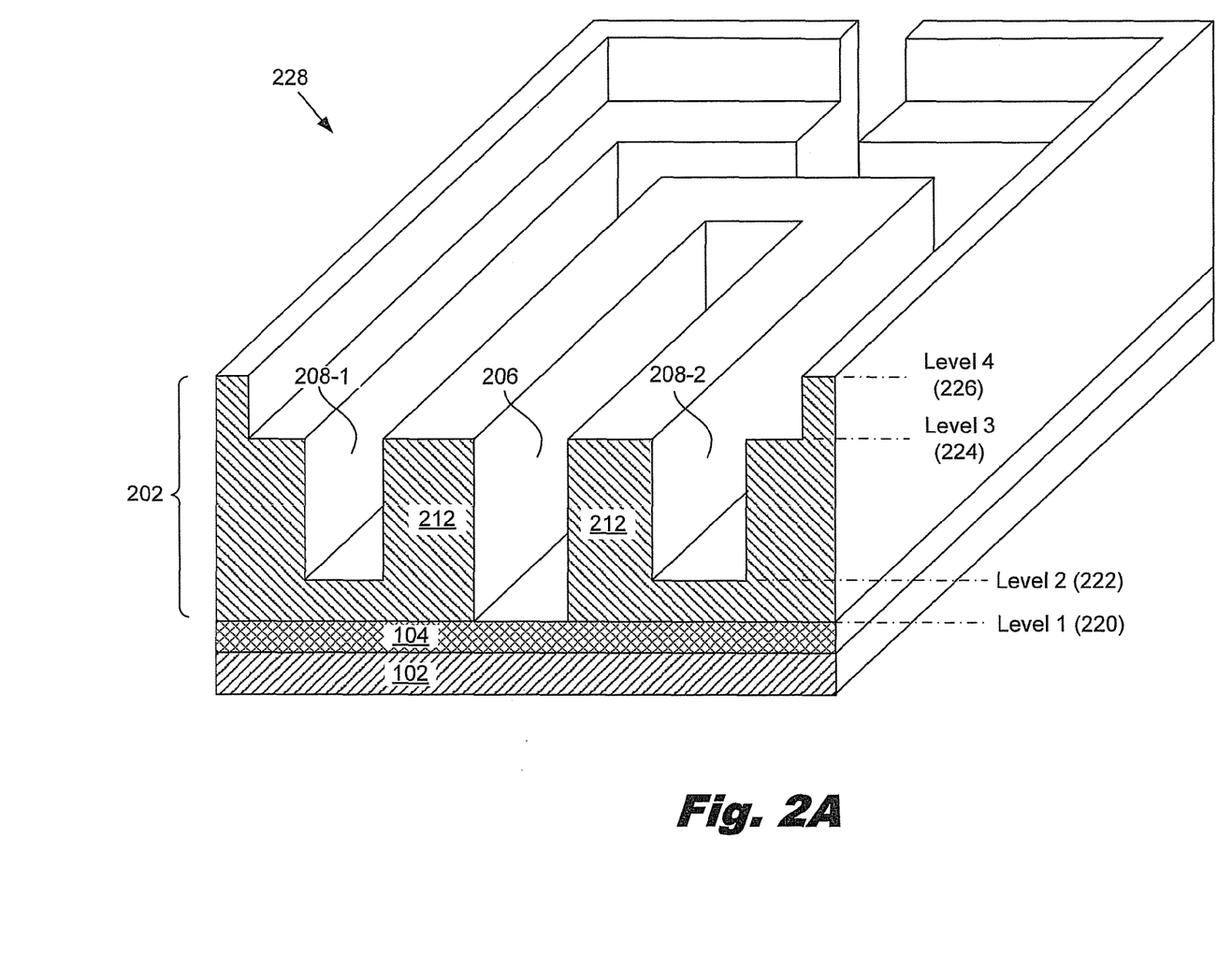
FIG. 2A is a perspective view of an illustrative template used to form a capacitive device, according to one embodiment of principles described herein.

FIGS. 2A-2E show an illustrative process for forming a capacitive element using the fabrication method described in FIGS. 1A-1E. FIG. 2A is a perspective view of an illustrative assembly (228) which includes a carrier layer (102), a sacrificial metal layer (104), and a cured resin template (202) which has been formed over the sacrificial metal layer (104). The assembly (228) can be used to form a capacitive element which is later transferred onto a flexible substrate. The cured resin template (202) is shown after it has been cured but before any metal or dielectric materials have been deposited.

In general, a capacitor is formed by two electrically conductive bodies which are separated by a dielectric material. The capacitance exhibited by the device is a function of the permittivity constant of the dielectric, the area of the surface of one conductive body facing the other conductive body, and the distance between them. These characteristics can be tuned to produce a capacitor which exhibits the desired capacitance. For example, the surface area of the conductive bodies can be increased to increase the capacitance.

The illustrative cured resin template (202) has four different levels (220, 222, 224, 226) which are created by master mold. As discussed above, metal may be selectively electrodeposited in the various levels by etching the resin template (202) to expose the sacrificial layer (104) at the bottom of the various channels (206, 208-1, 208-2). According to one illustrative embodiment, a center channel (206) is formed at Level 1 (220). Ideally, level 1 (220) could be the same elevation as the upper surface of the sacrificial layer (104) and there would be no resin in the bottom of the center channel (206). However, during the process of forming the resin template, there may be some stray portions of resin which remain on the bottom of the center channel (206). These stray portions of resin can be removed by plasma ashing before the electro deposition of metal into the center channel (206).

Two branched channels (208-1, 208-2) are formed at the level 2 (222) of the resin template (202). The branched channels (208-1, 208-2) join at the rear of the template and exit through the rear wall. Level 3 (224) of the template is at the top of the separation walls (212) which separate the center channel (206) from the forked channels (208-1, 208-2). Level 4 (226) is the top of the cured resin template (202). The walls between level 3 (224) and level 4 (226) of the template (228) are configured to contain the deposited metal and prevent it from spilling over into adjacent areas.

Figure 2B:
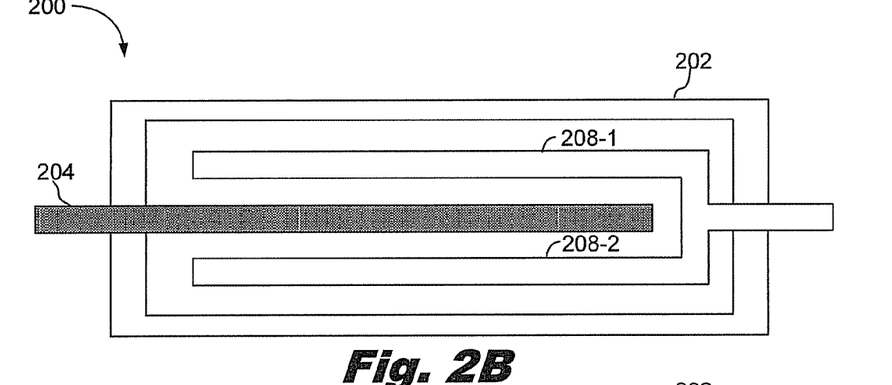
FIGS. 2B-2D show steps in an illustrative process for fabricating a capacitive device, according to one embodiment of principles described herein.
Figure 2C:
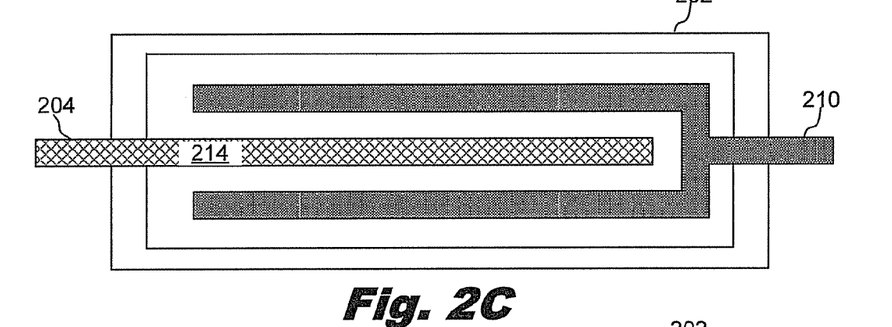
Figure 2D:
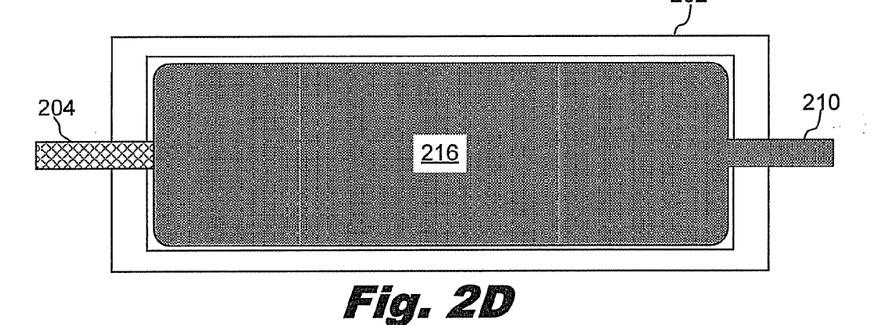

FIGS. 2B-2D are top views of the cured resin template (202) which show various steps in an illustrative process for fabricating a capacitive element in an integrated circuit. FIG. 2B shows one illustrative method for forming the center capacitor plate. After the channel (206) is plasma etched to expose the underlying substrate at the bottom of the channel (208), the assembly (228) is submerged in the electroplating solution with the carrier substrate connected as the cathode and a voltage is applied (104). The metal ions in the solution are attracted to the exposed portion of the sacrificial layer (104) and build up a center capacitor plate (204) within the center channel (206, FIG. 2A).

FIG. 2B illustrates a dielectric layer (214) which is formed over the center capacitor plate (204, FIG. 2B). The dielectric layer (214) may be formed in a variety of ways, including by an electrophoretic process or an anodization process. After the dielectric layer (214) has been formed, plasma ashing is reapplied to the resin template (202) to remove the bottom of the forked channels (208-1, 208-2) in the second level of the template to expose the conductive material underneath. With the conductive material exposed, metal can be deposited into the forked channels (208-1, 208-3) via an electroforming process to form a branched capacitor plate (210). A portion of the forked capacitor plate (210) extends to the right so that an external electrical connection can be made to the branched capacitor plate.

FIG. 2C shows the continuation of the electroforming process. The metal continues to be deposited over the branched capacitor plate (210) until it overflows the original channels (208-1, 208-2) and grows laterally over in the confinement area between level 3 (224; FIG. 2A) and level 4 (226, FIG. 2A). The electroforming process is continued for whatever period of time is necessary to allow the deposited metal cover the dielectric material (214) and spread throughout the confinement area. The containment level in the cured resin template (202) is used to keep the deposited metal from spilling over into unwanted areas of the integrated circuit. This will form a crossover region (216) over the first elongated channel (206). After the process is complete, a capacitance will be exhibited between the center capacitive plate (204) and the branched capacitive plate (210).

Figure 2E:
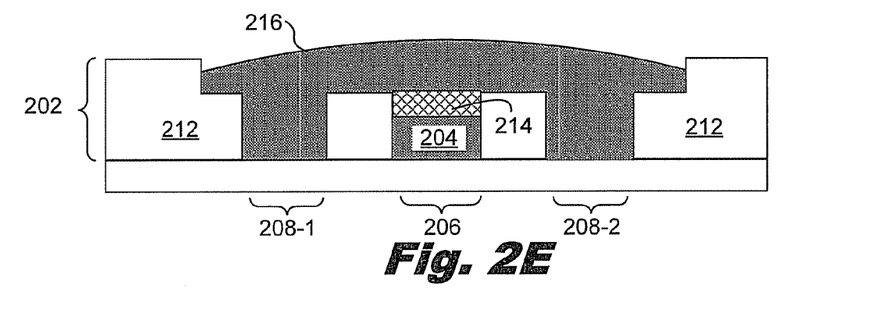
FIG. 2E shows a cross sectional view of the capacitive device illustrated by FIGS. 2A-2D, according to one embodiment of principles described herein.

FIG. 2E shows a cross-sectional view of the capacitive device. The central channel (206) has been filled with metal to form the central capacitive plate (204). The central capacitive plate (204) is electrically isolated from the branched capacitive plate (216) by the resin template on the sides and dielectric material (214) on the top. The electroforming process which formed the branched capacitive plate (216) has been continued until the metal laterally spreads to cover the dielectric material (214) and to form a crossover region.

Figure 3A:
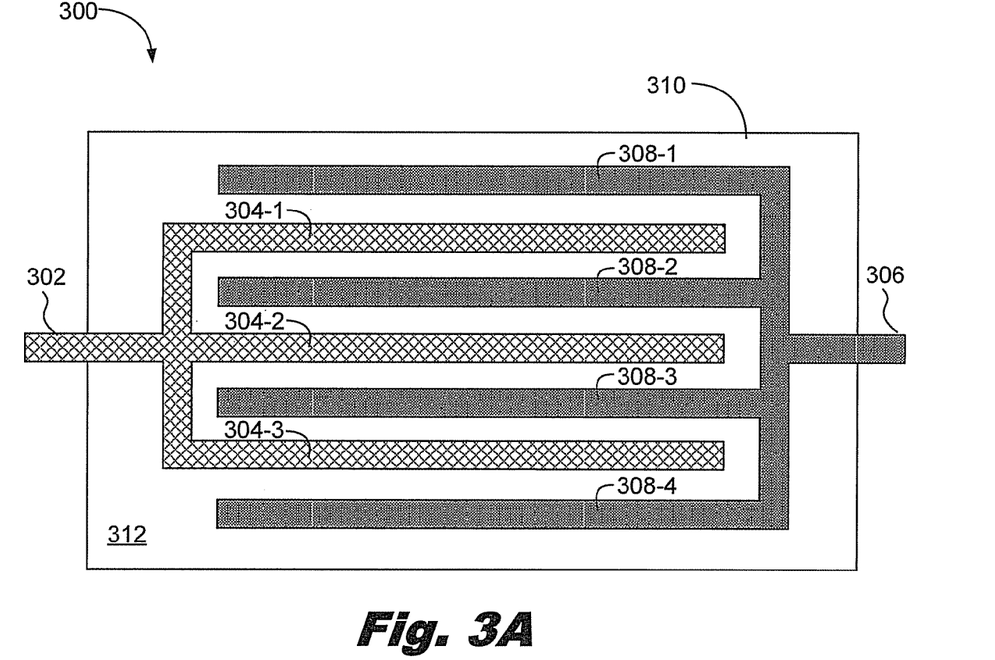
FIGS. 3A-3B show steps in an illustrative process for fabricating a capacitive device, according to one embodiment of principles described herein.
Figure 3B:
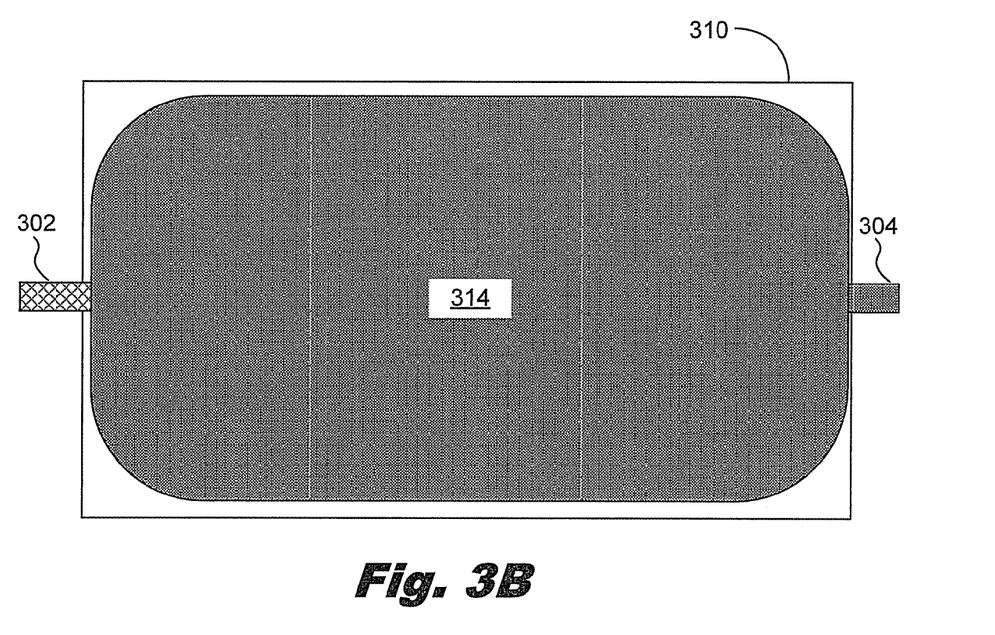

To create elements with larger capacitances, the surface area of the two capacitive plates can be enlarged. FIGS. 3A-3B show an illustrative process for fabricating a capacitive element with additional interleaved channels. The template for forming a capacitive element as shown in FIGS. 2A-2D can be expanded to include additional elongated channels.

FIG. 3A illustrates a template wherein the first terminal (302) is connected to a set of three parallel channels (304-1, 304-2, 304-3). The second terminal (306) is connected to a set of four parallel channels (308-1, 308-2, 308-3, 308-4) which are interleaved between the set of three elongated channels. The resin template (312) can be designed so that the set of three parallel channels (304-1, 304-2, 304-3) is at a first level and the set of four parallel channels (308-1, 308-2, 308-3, 308-4) is at a second level in the resin template. According to one illustrative embodiment, the first level is the lowest level. The first capacitive element can be formed first by the electrodeposition of metal into the set of three elongated channels (304-1, 304-2, 304-3) connected to the first terminal (302). A dielectric material will then be formed on top of the metal formed in the three elongated channels (304-1, 304-2, 304-3). Next, metal can be deposited into the set of four elongated channels (308-1, 308-2, 308-3, 308-4) creating the second capacitive element.

FIG. 3B illustrates the electroforming process continuing until it has formed a crossover region (314) which covers the dielectric material and connects all the branches of the second capacitive element. The electroforming process may continue until the set of four elongated metal elements have made sufficient electrical contact with one another. Again, a containment level (310) in the resin template (312) may prevent the buildup from extending into unwanted areas of the integrated circuit. After the process is complete, an electrical capacitance will be exhibited between the first terminal (302) and the second terminal (306).

The examples given above are only illustrative embodiments of capacitive devices which could be formed. A capacitive device may be formed through any number of branch elements connected to a first terminal. These branched elements connected to a first terminal may be interleaved between a set of branched elements connected to a second terminal. A variety of other configurations could be used. According to one illustrative embodiment, the capacitive device may have multiple capacitive plates and terminals. For example, a capacitive device may have three terminals which are connected to three separate capacitive elements. The three capacitive elements may mutually interact and exhibit different capacitances for each different pairing of the three capacitive elements. In another embodiment, multiple metal-dielectric—metal layers may be built up in the z-direction to create a stacked capacitor configuration. This would be achieved by increasing the number of levels in the multilevel template and carrying out successive etch—metal plate-dielectric plate—etch steps.

Figure 4:
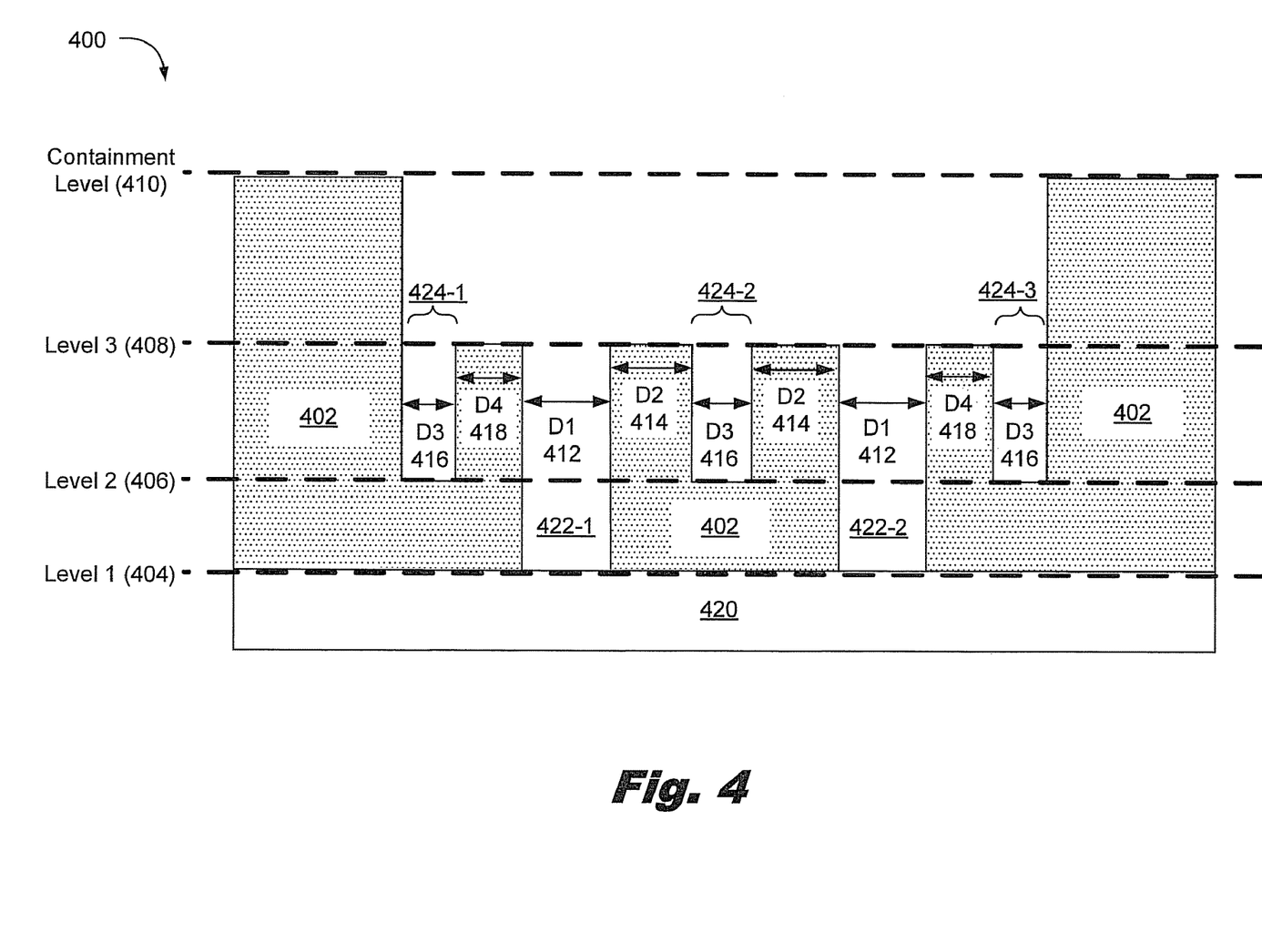
FIG. 4 shows a cross sectional view of an illustrative template used to form the capacitive device illustrated in FIGS. 3A-3B, according to one embodiment of principles described herein.

The capacitance produced by the assemblies described above result from the electrical interaction of the two capacitive plates. To provide an understanding of how the structures described in FIG. 2 and FIG. 3 exhibit capacitance, FIG. 4 illustrates a side view of an illustrative resin template (400) designed to form a capacitive element in an integrated circuit. FIG. 4 illustrates a side view of five channels (422-1, 422-2, 424-1, 424-2, 424-3) designed to be filled up with metal deposits. A first set of two elongated channels (422-1, 422-2) are designed to be connected at a first terminal, and a second set of three elongated channels (424-1, 424-2, 424-3) connected at a second terminal. The width of the elongated channels does not necessarily have to be consistent. One set of elongated channels could be one width (412) while the other set of elongated channels could be another width (416). According to one illustrative embodiment, the widths of the channels are in the micrometer range.

The resin template (400) comprises four basic levels. The first level (404) exposes the sacrificial metal layer (420) so that metal can be deposited thereon through an electroforming process. The first set of two channels (422-1, 422-2) is initially patterned at this level. The metal is deposited in first set of two channels (422-1, 422-2) until it has almost reached the third level (408). The dielectric layer is then deposited via electrophoresis until it passes the third level (408).

The second set of channels (424-1, 424-2, 424-3) are initially patterned at the second level (406). The elements formed in these channels are electrically insulated from the elements deposited into the first set of channels (422-1, 422-2) by the resin walls of the channels and the dielectric layer formed over the first set of channels (422-1, 422-2). Before the metal can be deposited into the second set of channels (424-1, 424-2, 424-3), the resin at the bottom of these channels is removed to expose a portion upper surface of the underlying conductive layer (420). As discussed above, the resin may be removed by plasma ashing. A metal can then be deposited into the second set of channels (424-1, 424-2, 424-3) by electro-deposition. The deposition continues until the deposited metal overflows level 3 (408) and flows laterally to electrically connect three elements (424-1, 424-2, 424-3). A containment level (410) is used to prevent the metal deposited from spreading over into other areas of the resin template.

As mentioned above, capacitance is a function of the permittivity constant of the dielectric, the area of the surface of one conductive body facing the other conductive body, and the distance between them. This relation is described in Eq. 1 below:

$$C = \varepsilon_r \varepsilon_o \frac{A}{d} \qquad \text{Eq. 1}$$

Where:
C=the capacitance in farads
A=the area of overlap between the two elements in square meters
$\varepsilon_r$=the dielectric constant of the insulator between plates
$\varepsilon_o$=the permittivity of free space
d=the separation between the plates in meters A capacitive device formed in the resin template of FIG. 4 contains multiple surfaces which interact to create capacitance between the two branched capacitive elements. As discussed above, resin walls separate the branched capacitive elements. The lateral interaction of the branched capacitive elements through these resin walls creates a capacitance. This capacitance is determined by the area of the sidewalls of the branched capacitive elements, the dielectric constant of the resin material, and the distance between the channels (422, 424). Capacitance is also created between the first branched capacitive element and the metal deposited into the crossover region. This capacitance will be determined by the top area of the set of two elongated elements, the dielectric constant of the deposited dielectric material, and the thickness of the deposited dielectric material. To calculate the approximate total capacitance of the device, the capacitance generated by lateral interaction and vertical interaction between the two capacitive elements can be summed.

In addition to capacitive devices, the process described above can be used to create inductive devices. FIGS. 5A-5D show an illustrative process for fabricating an inductive device element. An inductor is a passive electronic device generally created by forming a conductive element into a coil. When an electrical current is passed through the coil, a magnetic field is generated which stores a portion of the electrical energy which is passing through the conductive element. When the electrical current is removed from the conductive element, the magnetic field collapses and returns a portion of the stored energy as electrical current. The following process describes the creation of an inductor design which has a flat spiral coil shape.

Figure 5A:
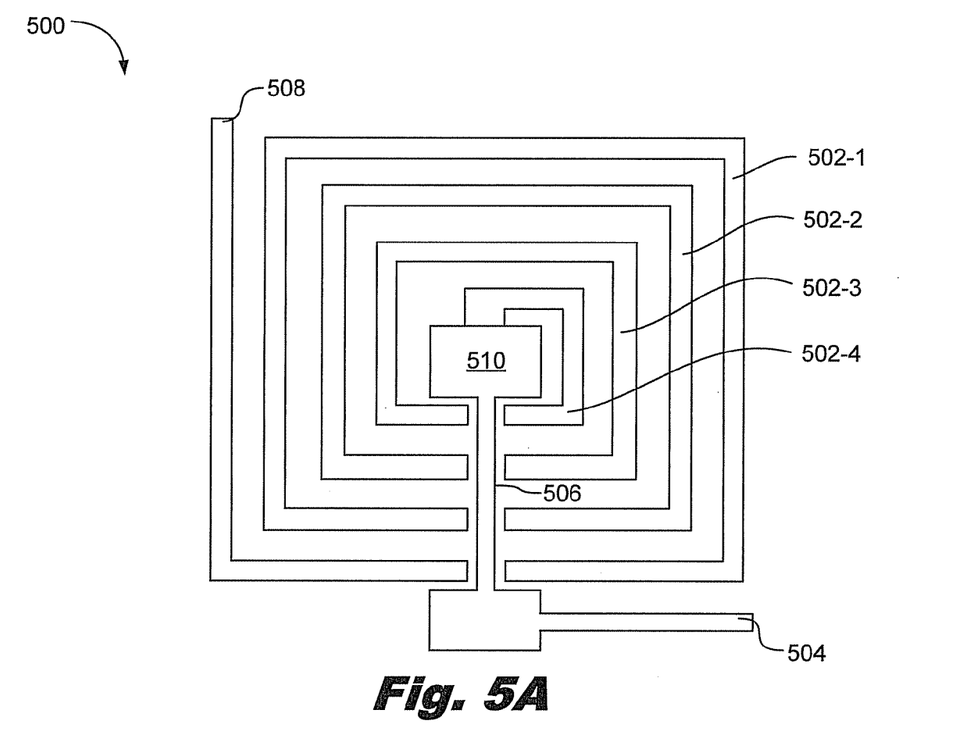
FIGS. 5A-5D show steps in an illustrative process for fabricating an inductive device, according to one embodiment of principles described herein.

FIG. 5A shows an illustrative resin template (500) used for fabricating an inductive device (500). In the first level of the template, a first terminal (504) is connected by a center channel (506) to an intermediate terminal (510). The second level of the template comprises a spiral channel which is segmented into a number of turns (502-1, 502-2, 502-3, 502-4) which bracket the center channel (506). When the crossovers over the center channel are completed, the spiral will start at the intermediate terminal (510), pass around the intermediate terminal (510) multiple times and end at second terminal (508). Although, FIG. 5 illustrates a spiral with four turns (502-1, 502-2, 502-3, 502-4), any number of turns may be used. Although the shape of the spiral in FIG. 5 is illustrated as being square, any shape of spiral may be used including but not limited to a rectangular, circular, or elliptical shaped spiral.

Figure 5B:
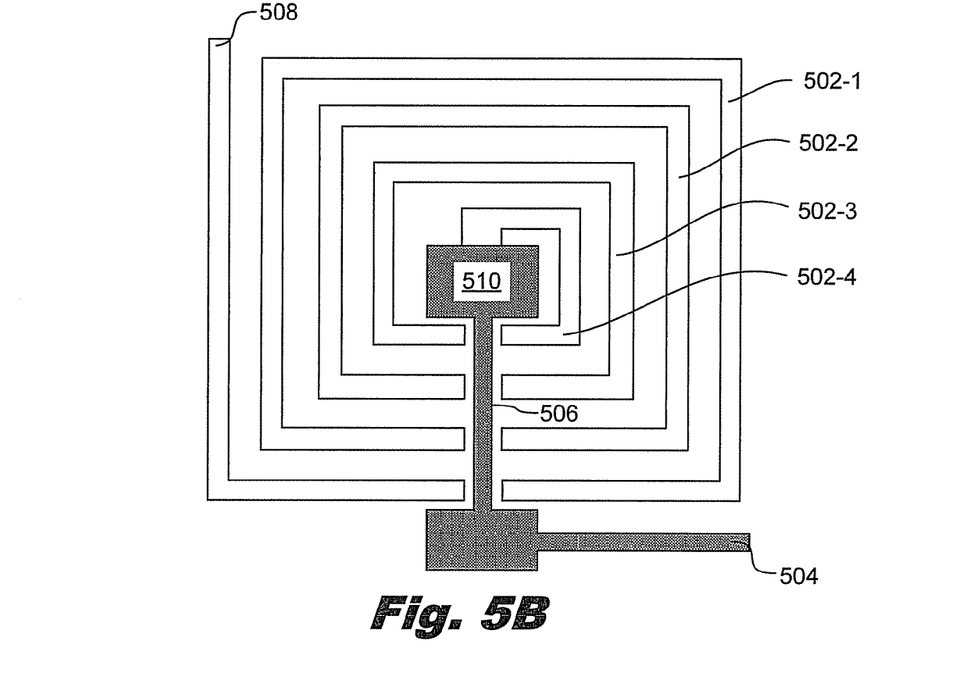

FIG. 5B illustrates the deposition of the first terminal (504), center channel (506), and intermediate terminal (510). As discussed above, plasma ashing may be used to remove the first level of resin within the template and expose the underlying conductive body. With the conductive body exposed, electroforming may be used to deposit metal into the first terminal (504), the center channel (506) and the intermediate terminal (510). The electro-deposition of metal continues until the metal traces are built up to the desired thickness.

Figure 5C:
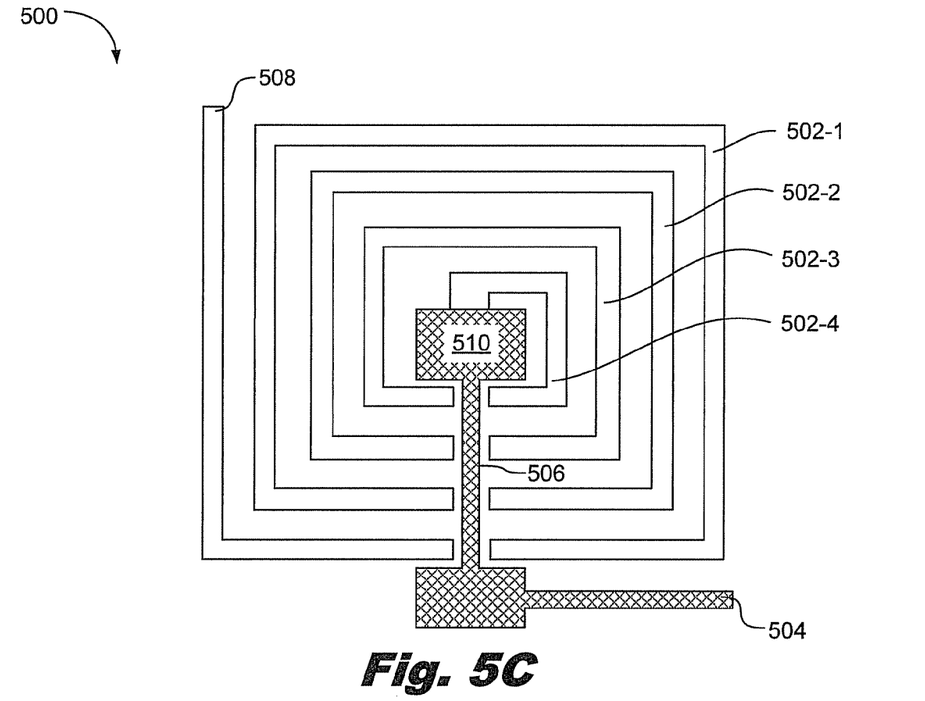

FIG. 5C shows the next step in fabricating the illustrative inductive device (500). In this step, a dielectric material is formed on first terminal (504), the center channel (506) and the intermediate terminal (510). As mentioned above, the dielectric material can be deposited in a number of ways including through an electro-deposition process or an anodization process.

Figure 5D:
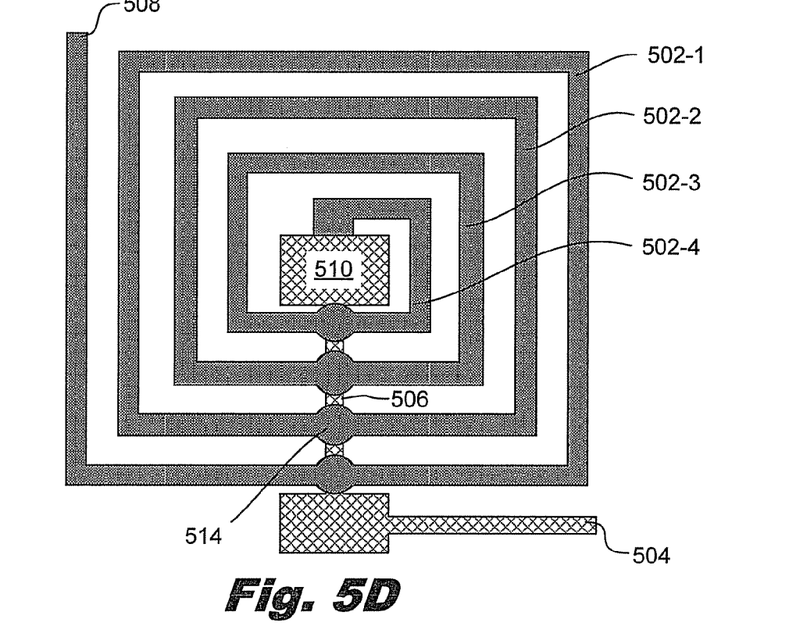

FIG. 5D shows the next step in fabricating an inductive device in which plasma ashing is used to expose the bottoms of the second level channels which form turns (502-1, 502-2, 502-3, 502-4). With the upper surface of the conductive body exposed at the bottom of the turns, metal may be deposited into the turns through an electroforming process. In one embodiment, a ferromagnetic metal may be used to increase the inductance of the device (500). The metal continues to be deposited until the trace segments join over across the dielectric material (512), thus creating a crossover region (514) over the center channel (506) at each turn (502-1, 502-2, 502-3, 502-4). When the process is complete, an electrical inductance will be exhibited between the first terminal (504) and second terminal (508).

When an inductive device includes a flat spiral coil, inductance of the device can be approximated as a function of the radius of the turns, the number of turns and a few constants. One illustrative relationship between the inductance and the coil geometry is given in Eq. 2.

$$L = \frac{r^2 N^2}{(2r + 2.8d) * 10^5} \qquad \text{Eq. 2}$$

Where:
L=the inductance in henries
r=the mean radius of the turns in meters
N=the number of turns
d=the depth of the turns (outer radius—inner radius) in meters As can be seen from Eq. 2, increasing the number of turns will increase the inductance. In order to do this, the spiral metal traces can be narrowed and the distance between each spiral turn can be reduced. According to one illustrative embodiment, there is a minimum spacing which should be maintained to prevent the electro deposition of metal on the upper trace and lower trace from joining and creating an electrical connection between the two traces.

Figure 6:
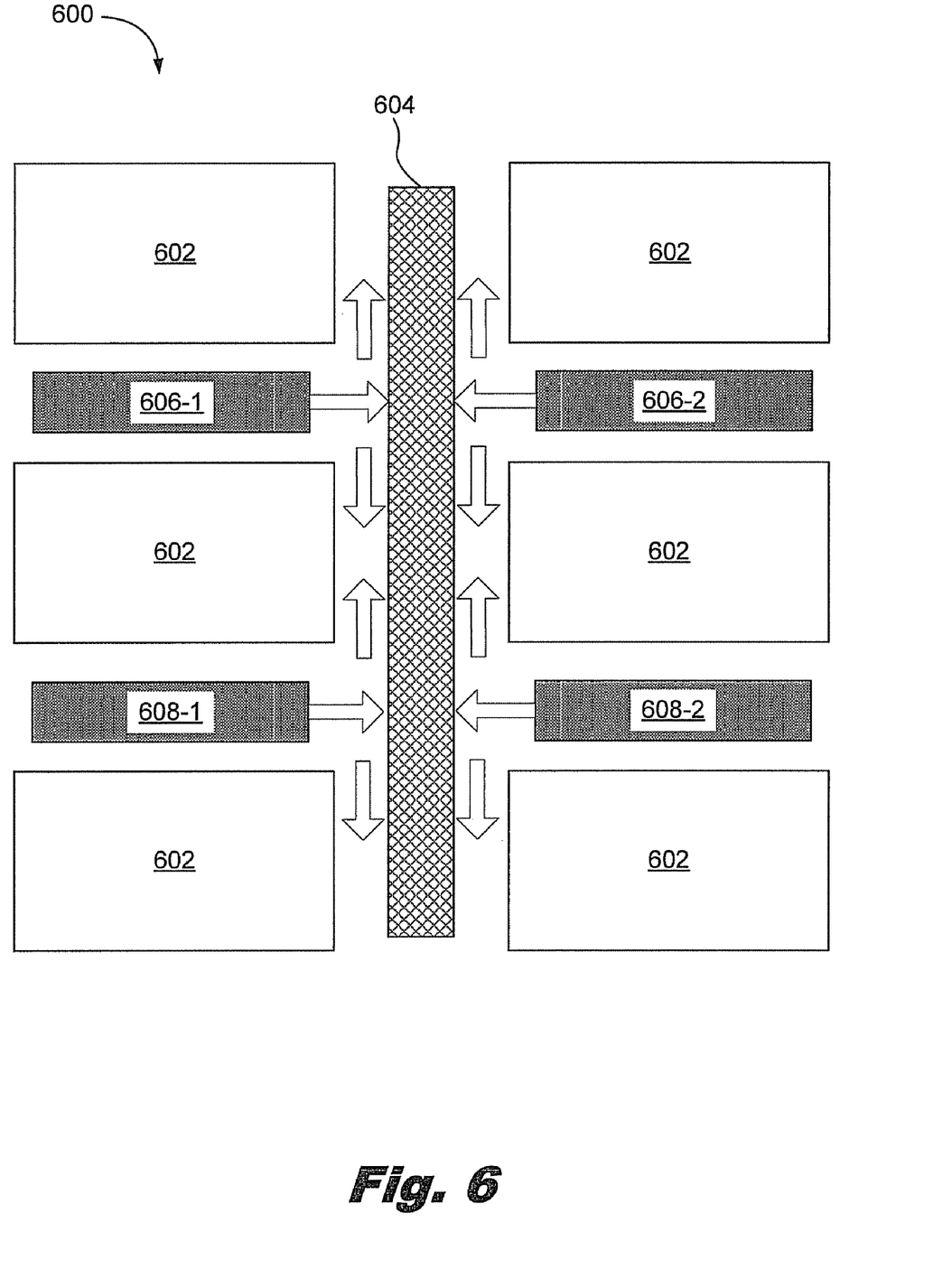
FIG. 6 is a diagram showing the flow of metal during an electro-deposition process, according to one embodiment of principles described herein.

FIG. 6 is a top view of a template which has adjacent crossovers. The steps of depositing the metal center trace (604) and its dielectric coating have been performed. The metal is now being deposited in the intersecting channels. Metal traces are being formed in elongated channels running perpendicular to the first metal trace. These metal traces will crossover the center trace (604). For example, metal will continue to be deposited on the trace segments (606-1, 606-2) until the metal forms a connection between the trace segments which crosses over the center trace (604). Similarly, lower trace segments (608-1, 608-2) will be connected to form a continuous trace which crosses over the center trace (604).

However, during electro-deposition of the metal, the deposited metal typically grows at approximately equal rates in all directions. As shown by the arrows in FIG. 6, the electro-deposition of metal grows the two electrode segments toward each other, but also grows material laterally up and down the center trace (604). Consequently, the distance between the trace segments which are to be joined should be less than the distance between the parallel traces. In this way, the upper trace segments (606-1, 606-2) will be joined to form an upper trace and the lower trace segments (608-1, 608-2) will be joined to form a lower trace without an electrical connection being formed between the upper trace and lower trace. The various parameters within the electroforming process may be controlled so that the desired amount of metal is deposited to form the parallel traces without creating shorts between the parallel traces. For example, the deposition time, current density, and/or voltage could be adjusted to control the amount of metal deposited in a crossover region.

Figure 7:
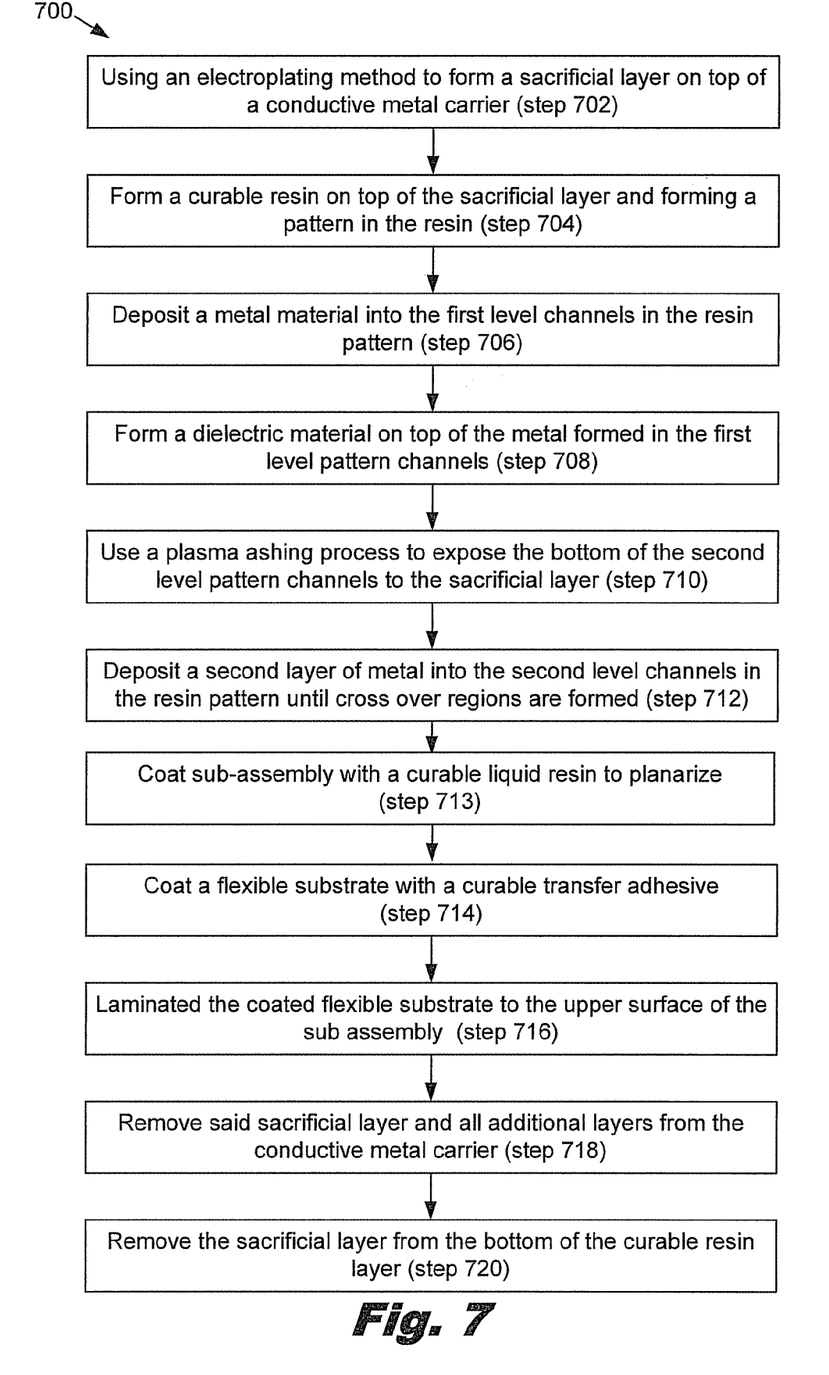
FIG. 7 is a flow chart of an illustrative method for fabricating a passive circuit component, according to one embodiment of principles described herein.

FIG. 7 is a flow chart which describes an illustrative process (700) for fabricating a passive circuit device and adhering the passive circuit device to a flexible substrate. The process illustrated in FIG. 7 can be used to fabricate both capacitive and inductive devices. First, an electroplating method is used to form a sacrificial layer on top of a conductive metal carrier (step 702). According to one illustrative embodiment, the sacrificial layer material may be a variety of conductive materials which suitable for electroplating and selective etching. One example of this type of material would be copper. Next, a curable resin layer is formed on top of the sacrificial layer and then templated (step 704). According to one illustrative embodiment, the template may include channels formed at least two different levels. A metal material is deposited using electroforming into the first level channels of the resin template (step 706). In some embodiments, plasma ashing may be performed to remove any stray resin from the bottom of the first level channels prior to deposition. A dielectric material is deposited on top of the metal formed in the first level channels (step 708). As discussed above, the forming of dielectric material can be performed in a variety of ways, including electro-deposition or anodizing the surface of the metal. A plasma etching process may then be used to expose the bottom of the second level channels to the sacrificial layer (step 710). With the conductive sacrificial layer exposed, metal can be deposited into the second level channels until the metal rises over the second level and dielectric material to form one or more crossover regions (step 712). The first level channels are connected to a first terminal and the second level channels are connected to a second terminal. Based on the layout of both the first and second level channels, a passive circuit element will be formed between the first terminal and the second terminal. According to one illustrative embodiment, the passive circuit subassembly may be coated with a curable liquid resin to planarize its upper surface (step 713).

To transfer the subassembly to a flexible substrate, the flexible substrate is coated with a curable adhesive (step 714). The coated flexible substrate is placed on top of the metal deposited into the second level channels (step 716). The sacrificial layer is then separated from the metal carrier (718). The sacrificial metal layer is then removed from the bottom of the resin template (step 720). This removal may be done through an etching process.

The templating process described in the above process is not limited to only one passive element. A template for a particular integrated circuit may contain any number of passive elements, connections, traces, etc. as dictated by the type and function of the integrated circuit.

Through use of the methods and processes described herein, passive electronic components such as capacitors and inductors may be manufactured and adhered to flexible substrate without damaging the flexible substrate. Additionally, the process also requires no alignment as all steps involve depositing material into the templated resin. After the initial template step, all subsequent steps do not require any selectively subtractive processes, thus no alignment is required. This simplicity and lack of alignment steps can make the process is more efficient and less expensive.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for fabrication of passive electronic components, the method comprising;
depositing a sacrificial layer on a carrier;

forming a curable resin layer on top of said sacrificial layer and patterning said curable resin to form a cured resin template, the cured resin template comprising a first pattern level and a second pattern level;

depositing a metal material into said first pattern level to form a first structure;

forming a dielectric material on exposed portions of said first structure;

using a nonselective subtractive process to expose said sacrificial layer in a bottom of said second pattern level; and depositing a metal material into said second pattern level to form a second structure which includes a portion which crosses over said dielectric material;

wherein a first terminal is connected to said first structure and a second terminal is connected to said second structure, said first structure and said second structure forming a passive electronic component between said first terminal and said second terminal.

2. The method of claim 1, further comprising:
adhering a flexible substrate to an upper surface of said passive electronic component; and
removing said carrier and said sacrificial layer.

3. The method of claim 1, further comprising:
coating a flexible substrate with a curable transfer adhesive;
placing said coated flexible substrate on top of the second structure;
removing said carrier from said sacrificial layer; and
removing said sacrificial layer using a selective chemical etch.

4. The method of claim 1, in which said passive electronic component is a capacitive element in which:
said first structure comprises at least one branch connected to a first terminal; and
said second structure comprises a set of branched channels connected to a second terminal, in which said at least one branch is interleaved between said set of branched channels.

5. The method of claim 4, in which set of branched channels crosses over said at least one branch.

6. The method of claim 1, in which said passive electronic component is an inductive element in which:
said first structure comprises a center trace covered with a dielectric material; and
said second structure is electrically connected to said center trace and comprises an outward spiral having intersections with said center trace, said outward spiral crossing over said center trace at said intersections without making electrical contact with said center trace at said intersections.

7. The method of claim 6, in which said outward spiral is a rectangular, circular, or elliptical shape.

8. The method of claim 1, in which said passive electronic component is an inductive element in which:
said first structure is electrically connected to said second structure and comprises an outward spiral covered with a dielectric material; and
said second structure comprises a center trace having intersections with said outward spiral; said center trace crossing over said outward spiral at said intersections without making electrical contact with said center trace at said intersections.

9. The method of claim 1, in which said patterning of said curable resin is performed by at least one of: imprint lithography, embossing, and photolithography.

10. The method of claim 1, in which said curable resin is at least one of: UV curable resin and thermally curable resin.

11. The method of claim 1, in which said depositing a metal material into said first and second pattern levels is performed by an electroforming process.

12. The method of claim 1, in which said forming of dielectric material is one of: an electrophoretic process and an anodizing process.

13. The method of claim 1, in which said nonselective subtractive process is plasma ashing.

* * * * *